(12) United States Patent
Borja Jaramillo et al.

(10) Patent No.: US 11,893,310 B2
(45) Date of Patent: *Feb. 6, 2024

(54) SYSTEM COMMAND PROCESSING

(71) Applicant: Amazon Technologies, Inc., Seattle, WA (US)

(72) Inventors: Andres Felipe Borja Jaramillo, Shoreline, WA (US); David Robert Thomas, Woodinville, WA (US); Shrish Chandra Mishra, Seattle, WA (US); Shijian Zheng, Issaquah, WA (US); Alberto Milan Gutierrez, Edmonds, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/834,404

(22) Filed: Jun. 7, 2022

(65) Prior Publication Data

US 2023/0051866 A1 Feb. 16, 2023

Related U.S. Application Data

(63) Continuation of application No. 15/803,222, filed on Nov. 3, 2017, now Pat. No. 11,360,736.

(51) Int. Cl.
*G10L 15/22* (2006.01)
*G06F 3/16* (2006.01)
(Continued)

(52) U.S. Cl.
CPC .......... *G06F 3/167* (2013.01); *G06F 9/30003* (2013.01); *G06F 40/10* (2020.01);
(Continued)

(58) Field of Classification Search
CPC ...... G06F 3/167; G06F 9/30003; G06F 40/10; G06F 40/40; G06F 40/205; G06F 17/27;
(Continued)

(56) References Cited

U.S. PATENT DOCUMENTS 9,424,840 B1* 8/2016 Hart .................. G10L 15/22
9,546,005 B2* 1/2017 Li ..................... G10L 15/22
(Continued)

*Primary Examiner* — Abdelali Serrou
(74) *Attorney, Agent, or Firm* — Pierce Atwood LLP

(57) ABSTRACT

Techniques for routing a user command to a speechlet and resolving conflicts between potential speechlets are described. A system determines an intent of an input command. The system also receives context information associated with the input command. The system determines speechlets (e.g., speechlets and/or skills) that may execute with respect to the input command given the intent and the context data. The system then determines whether conditions of routing rules, associated with the speechlets, are satisfied given the context data. If the conditions of only one routing rule are satisfied, the system causes the speechlet associated with the routing rule to execute with respect to the input command. If the conditions of more than one routing rule are satisfied, the system may determine a speechlet to execute with respect to the input command based on the speechlets' priorities in a list of speechlets and/or based on potential output data provided by the speechlets.

20 Claims, 11 Drawing Sheets

(51) Int. Cl.
  *G10L 15/26* (2006.01)
  *G10L 15/30* (2013.01)
  *G06N 5/04* (2023.01)
  *G06F 9/30* (2018.01)
  *G10L 13/04* (2013.01)
  *G06F 40/10* (2020.01)
  *G06F 40/40* (2020.01)

(52) U.S. Cl.
  CPC ............... *G06F 40/40* (2020.01); *G06N 5/04* (2013.01); *G10L 13/04* (2013.01); *G10L 15/22* (2013.01); *G10L 15/26* (2013.01); *G10L 15/30* (2013.01)

(58) Field of Classification Search
  CPC .................. G06F 9/451; G06F 16/3329; G06F 16/90332; G06F 17/278; G10L 13/04; G10L 15/22; G10L 15/26; G10L 15/30; G10L 15/1822; G10L 2015/223; G10L 15/265; G10L 2015/228; G10L 15/1815; G10L 15/18; G10L 15/32; G10L 17/22
  See application file for complete search history.

(56) References Cited

U.S. PATENT DOCUMENTS

| | | | | |
|---|---|---|---|---|
| 10,140,973 | B1* | 11/2018 | Dalmia | G06F 40/30 |
| 10,236,016 | B1* | 3/2019 | Li | G10L 15/26 |
| 10,643,609 | B1* | 5/2020 | Pogue | G10L 15/18 |
| 10,692,489 | B1* | 6/2020 | Grizzel | G06F 3/167 |
| 11,205,421 | B2* | 12/2021 | Firik | G06F 3/167 |
| 2017/0083285 | A1* | 3/2017 | Meyers | G10L 15/00 |
| 2017/0345422 | A1* | 11/2017 | Yang | G06F 3/167 |

* cited by examiner

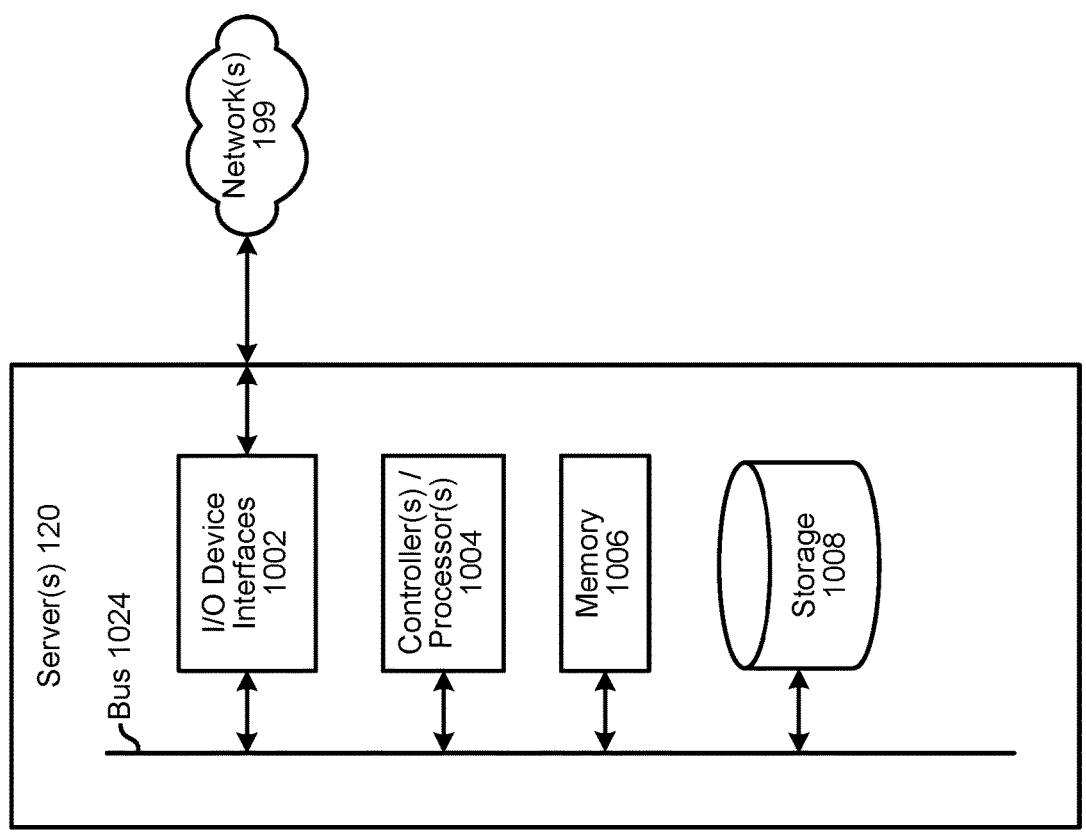

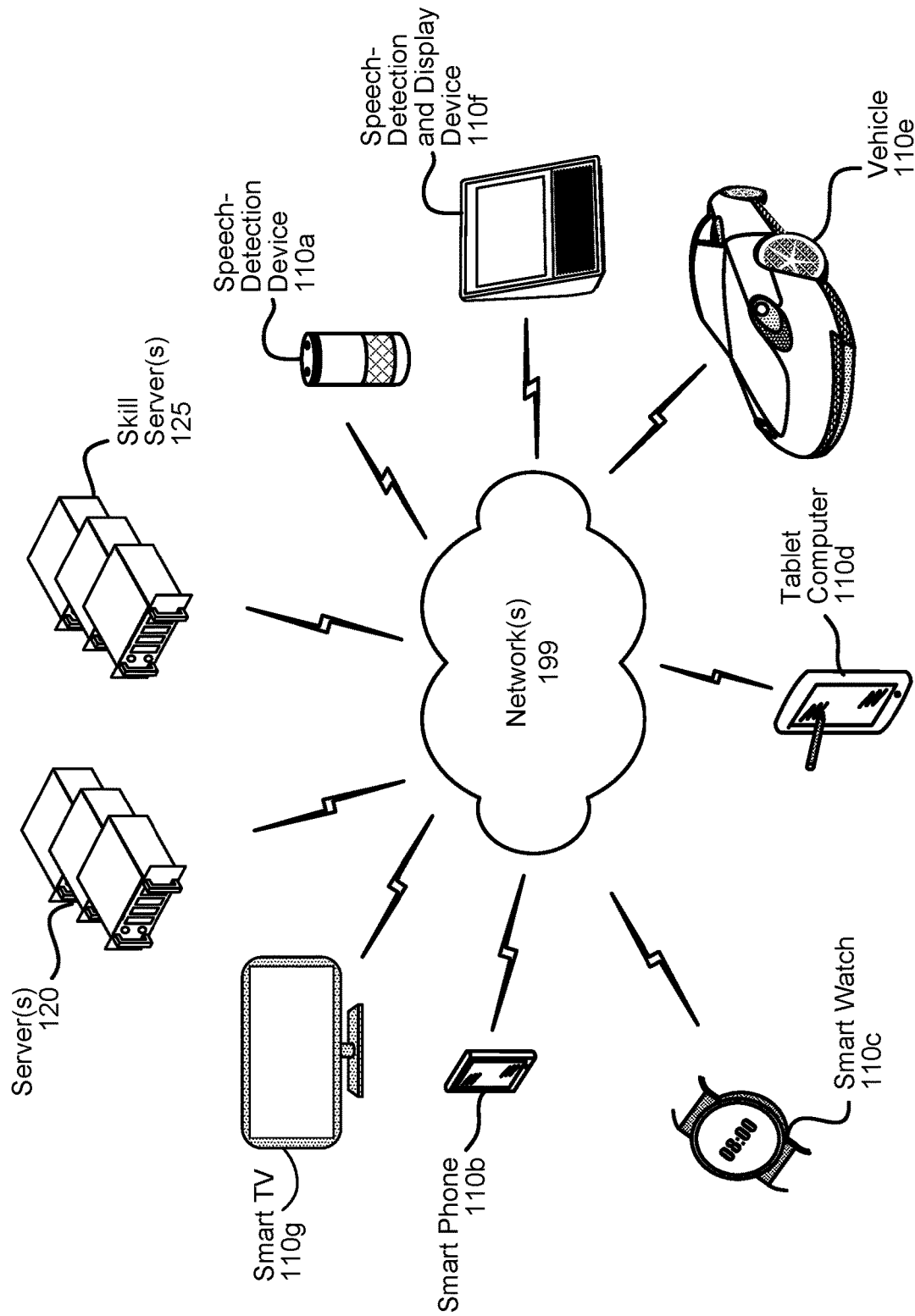

SYSTEM COMMAND PROCESSING

CROSS REFERENCE TO RELATED APPLICATIONS

This application is a continuation of U.S. patent application Ser. No. 15/803,222, entitled "SYSTEM COMMAND PROCESSING", filed on Nov. 3, 2017, scheduled to issue as U.S. Pat. No. 11,360,736, which is herein incorporated by reference in its entirety.

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 10 is a block diagram conceptually illustrating example components of a server according to embodiments of the present disclosure.

FIG. 11 illustrates an example of a computer network for use with the speech processing system.

DETAILED DESCRIPTION

Figure 1:
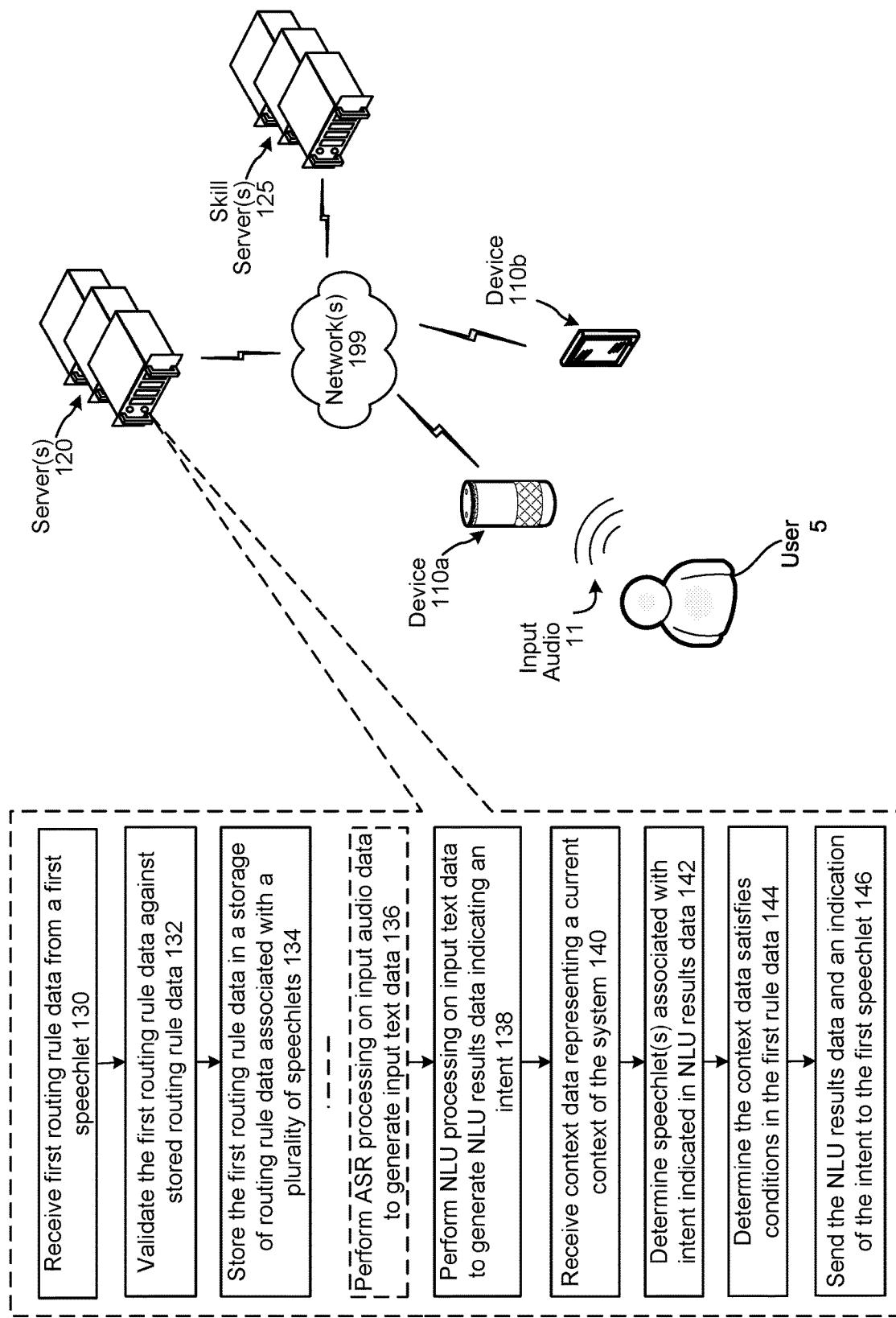
FIG. 1 illustrates a system for routing speech processing data to a speechlet based on natural language routing rules and context information according to embodiments of the present disclosure.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language. Text-to-speech (TTS) is a field of computer science, artificial intelligence, and linguistics concerned with enabling computers to output synthesized speech. ASR, NLU, and TTS may be used together as part of a speech processing system.

A speech controlled computing system may answer user inputs requesting the output of content. For example, a user may say "Alexa, get me a car." In response, the system may book the user a ride with a ride sharing service. For further example, a user may say "Alexa, order me a pizza." In response, the system may order the user a pizza via a web-based ordering system of a pizza restaurant.

Certain speech processing systems perform NLU to derive a list of intents that potentially relate to a user input. Intent data represents a system action that a user or different system desires the system to perform. During NLU processing, for example, the system processes the text of the user utterance to determine one or more intents that may represent to the user command. For example, a system may determine an input utterance of "Play Adele" potentially relates to a <PlayMusic> intent and a <PlayVideo> intent, since the utterance may correspond to a request to play Adele music or a request to play an Adele music video. Once the system has determined a list of intents, the system may ask various speechlets if they can execute given one or more intents in the list.

A speech processing system may be configured with multiple speechlets that can each execute with respect to a given user input and intent. For example, a music speechlet and a video speechlet may both be capable of executing a user input of "Play Adele" that is associated with a <Play> intent. Thus, a speech processing system may include ambiguity between speechlets that makes it difficult for the system to select the best speechlet for executing a user input.

Certain speech processing systems may query speechlets based on their priority in a list of speechlets. For example, a list of speechlets may include a first content source, a second content source, a third content source, etc., with the location of the speechlets within the list being dictated by when the speechlets became associated with the system. Other factors may also impact the priority of one speechlet versus another content source. A system could query the speechlets in a priority-sequential order. That is, the system could query the first speechlet first, query the second speechlet second, etc. Certain systems may cease querying speechlets once a speechlet indicates it can execute the user input given an intent. For example, if the system queries the first speechlet and the first speechlet indicates it can execute with respect to the user input, the system may refrain from querying the second and third speechlets in the list. This may lead to disproportionate routing of user inputs to speechlets with higher priority in speechlet lists.

Certain speech processing systems may query "focused" speechlets prior to querying unfocused speechlets. A speechlet may be in interactive focus, meaning the speechlet was the most recent speechlet that executed a user input and/or the speechlet may be involved with an open dialog (e.g., series of utterances and responses) with a user device. Interactive focus attempts to continue a conversation between a user and the system and/or a speechlet for purposes of processing the dialog. However, there may be instances where a user input may be handled by a speechlet that is currently in interactive focus, but which the user does not intend to be executed by such content source.

A speechlet may alternatively be in content focus, meaning the speechlet is associated with content that is streaming to the user and/or device associated with a current user input when the current user input is received by the system. For example, a previous user input of "Play music" may result in the system streaming music to a device from a specific music content source. While the speechlet is streaming the music, the same user may provide the system with a second input. Since the second user input was received when the music speechlet was streaming the music, the system may query that music speechlet in the first instance, even if the second user input is not necessarily intended for the music content source. The music speechlet may be configured to attempt to execute the subsequent user input (and potentially output an error) even though the user may have intended another speechlet to execute such user input.

The present disclosure provides a system architecture and associated techniques for improved routing of NLU results to speechlets that determines which is the best speechlet for a user input is while decrease the likelihood of disproportionate or inaccurate routing. A system according to the present disclosure includes a system orchestration component configured with an aggregator that can incorporate knowledge of speechlet functionality as well as routing rules provided by speechlets. A content source's routing rule(s) may include conditions or fact sets that the speechlet proposes justifies routing of a user input to the content source. The conditions of a routing rule may be dependent upon current system context, such as time of day, location, type of device invoked, or a variety of other factors.

A system according to the present disclosure may also include a conflict resolution mechanism for eliminating conflicts between routing rules of different speechlets. A system may implement conflict resolution techniques when the system attempts to validate a content source's new routing rule(s).

FIG. 1 illustrates a system for routing speech processing data to a speechlet based on natural language routing rules and context information. Although the figures and discussion illustrate certain operational steps of the system in a particular order, the steps described may be performed in a different order (as well as certain steps removed or added) without departing from the intent of the disclosure. Devices (110a/110b) local to a user 5, one or more server(s) 120, and one or more skill servers 125 may communicate across one or more networks 199.

During some training or configuration time period, the server(s) 120 receives (130) first routing rule data from a first content source. A speechlet may correspond to a speechlet 290 (described herein) or a skill server(s) 125. A routing rule may represent a set of conditions or facts that, if satisfied, justify routing of a user input to the speechlet associated with the routing rule. For example, a routing rule may indicate that every time NLU processing outputs a <Shopping> intent, the user input should be routed to a specific shopping content source. For further example, a routing rule may indicate that when NLU processing outputs a <PlayMusic> intent and the device that originated the user input is a displayless/headless device, the user input should be routed to a specific music content source.

The server(s) 120 validates (132) the first routing rule data against stored routing rule data (for example by determining the new first routing rule does not conflict with existing routing rules). The server(s) 120 may include a storage component of routing rule data associated with various speechlets. A speechlet may include/communicate with a source of content or function as a content source. When the server(s) 120 receives new routing rule data, the server(s) 120 may refrain from storing or validating the new routing rule data in the storage unless the server(s) 120 can validate the new routing rule data (i.e., ensure the new routing rule data does not include the same or otherwise conflicting conditions as currently stored routing rule data). Once the server(s) 120 validates the first routing rule data, the server(s) 120 stores (134) the first routing rule data in the storage of routing rule data associated with various speechlets.

Once the rules are configured and stored, during some later runtime period the device 110a may receive input audio 11 corresponding to a spoken utterance originating from the user 5. The device 110a generates input audio data corresponding to the input audio 11 and sends the input audio data to the server(s) 120. If the server(s) 120 receives input audio data from the device 110a, the server(s) 120 performs (130) ASR on the input audio data to generate input text data.

Alternatively, the device 110b may receive input from the user 5 corresponding to text via a touch screen providing a virtual keyboard. The device 110b may generate input text data corresponding to the input text. The device 110b may send the input text data to the server(s) 120 via a companion application operating on the device 110b and in communication with the server(s) 120.

The server(s) 120 performs (138) NLU on input text data (i.e., received from the device 110b or generated by ASR processing on input audio data received from the device 110a) to generate NLU results data indicating an intent. The server(s) 120 also receives (140) context data representing a current context of the system. For example, the context data may include information corresponding to a time of day, a location of the device (110a/110b), a type of the device (110a/110b), etc.

The server(s) 120 determines (142) the one or more speechlets associated with the intent indicated in the NLU results data. That is, the server(s) 120 determines one or more speechlets that may execute a user input associated with the intent indicated in the NLU results data. The server(s) 120 then determines whether the context data satisfies stored routing rule data associated with the one or more speechlets. In the example of FIG. 1, the server(s) 120 determines (144) the context data satisfies the conditions in the first rule data. The server(s) 120 thereafter sends (146) the NLU results data and an indication of the intent to the first content source.

Figure 2:
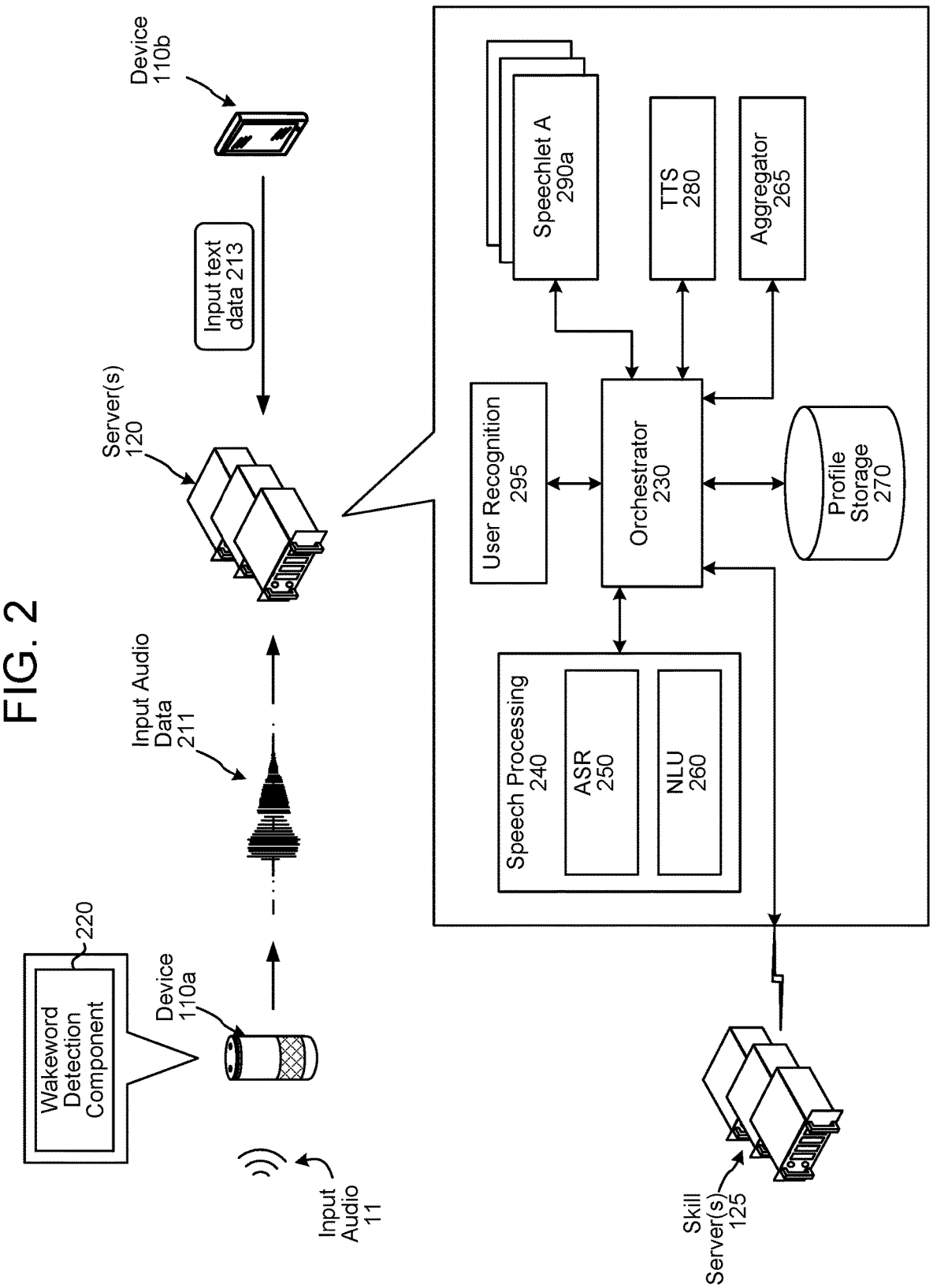
FIG. 2 is a conceptual diagram of components of a system according to embodiments of the present disclosure.

The system may operate using various components as described in FIG. 2. The various components may be located on a same or different physical devices. Communication between various components may occur directly or across a network(s) 199.

The device 110a may receive input audio 11, corresponding to a spoken utterance, using an audio capture component, such as a microphone or array of microphones. The device 110a, using a wakeword detection component 220, processes input audio data corresponding to the input audio 11 to determine if a keyword (e.g., a wakeword) is detected in the input audio data. Following detection of a wakeword, the device 110a sends input audio data 211, corresponding to the utterance, to the server(s) 120.

Upon receipt by the server(s) 120, the input audio data 211 may be sent to an orchestrator component 230. The orchestrator component 230 may include memory and logic that enables the orchestrator component 230 to transmit various pieces and forms of data to various components of the system.

The orchestrator component 230 sends the input audio data 211 to a speech processing component 240. An ASR component 250 of the speech processing component 240 transcribes the input audio data 211 into input text data representing one more hypotheses representing speech contained in the input audio data 211. The ASR component 250 interprets the utterance in the input audio data 211 based on a similarity between the utterance and pre-established language models. For example, the ASR component 250 may compare the input audio data 211 with models for sounds (e.g., subword units, such as phonemes, etc.) and sequences of sounds to identify words that match the sequence of sounds spoken in the utterance represented in the input audio data 211. The ASR component 250 sends (either directly or via the orchestrator component 230) the input text data generated thereby to an NLU component 260 of the speech processing component 260. The input text data output by the ASR component 250 may include a top scoring hypothesis or may include an N-best list including multiple hypotheses. An N-best list may additionally include a score associated with each hypothesis represented therein. Each score may indicate a confidence of ASR processing performed to generate the hypothesis with which it is associated.

Alternatively, the device 110b may send input text data 213 to the server(s) 120. Upon receipt by the server(s) 120, the input text data 213 may be sent to the orchestrator component 230. The orchestrator component 230 may send the input text data 213 to the NLU component 260.

The NLU component 260 attempts to make a semantic interpretation of the phrases or statements represented in the input text data input therein. That is, the NLU component 260 determines one or more meanings associated with the phrases or statements represented in the input text data based on individual words represented in the input text data. The NLU component 260 determines an intent (e.g., a system action that a user desires the system to perform) of a user input represented in the input text data as well as pertinent pieces of information in the input text data that allow a device (e.g., the device 110a, the device 110b, the server(s) 120, the skill server(s) 125, etc.) to execute the intent. For example, if the input text data corresponds to "call mom," the NLU component 260 may determine a user intended to activate a telephone in his/her device and to initiate a call with a contact matching the entity "mom."

The server(s) 120 may include an aggregator component 265 that receives NLU results data and determines (as described in detail herein) which speechlet(s) 290 and/or skill server(s) 125 the system should call to execute a user input. The aggregator component 265 may be implemented separately from the orchestrator component 230 (as illustrated) or one or more components of the aggregator component 265 may be implemented as part of the orchestrator component 230.

A "speechlet" may be software running on the server(s) 120 that is akin to an application. That is, a speechlet 290 may enable the server(s) 120 to execute specific functionality in order to provide data or produce some other output requested by a user. The server(s) 120 may be configured with more than one speechlet 290. For example, a weather service speechlet may enable the server(s) 120 to provide weather information, a car service speechlet may enable the server(s) 120 to book a trip with respect to a taxi or ride sharing service, an order pizza speechlet may enable the server(s) 120 to order a pizza with respect to a restaurant's online ordering system, etc.

A skill server(s) 125 may operate one or more skills. A "skill" may be software running on a skill server(s) 125 that is akin to an application. That is, a skill may enable the skill server(s) 125 to execute specific functionality in order to provide data or produce some other output requested by a user. A skill server(s) 125 may be configured with more than one skill. For example, a weather service skill may enable a skill server(s) 125 to provide weather information to the server(s) 120, a car service skill may enable a skill server(s) 125 to book a trip with respect to a taxi or ride sharing service, an order pizza skill may enable a skill server(s) 125 to order a pizza with respect to a restaurant's online ordering system, etc.

The functions provided by one or more speechlets 290 may overlap or be different from the functions provided by one or more skills. Speechlets 290 and/or skills may be implemented in some combination of hardware, software, firmware, etc.

A speechlet(s) 290 and may be in communication with one or more skill servers 125 implementing different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, as well as custom skills that are not associated with any pre-configured type of skill.

In some instances, a speechlet(s) 290 or a skill server(s) 125 may provide output text data responsive to the present user input. The server(s) 120 may include a text-to-speech (TTS) component 280 that generates output audio data from speechlet(s) 290 and skill server(s) 125 provided output text data. The TTS component 280 may use different synthesis techniques. In one method of synthesis called unit selection, the TTS component 280 analyzes text data against a database of recorded speech. The TTS component 280 selects units of recorded speech matching the text data and concatenates the units together to form output audio data. In another method of synthesis called parametric synthesis, the TTS component 280 varies parameters such as frequency, volume, and noise to create output audio data including an artificial speech waveform. Parametric synthesis uses a computerized voice generator, sometimes called a vocoder.

The server(s) 120 may include a user recognition component 295. The user recognition component 295 may take as input the input audio data 211 and/or input text data output by the ASR component 250. The user recognition component 295 determines scores indicating whether the user input originated from a particular user. For example, a first score may indicate a likelihood that the user input originated from a first user, a second score may indicate a likelihood that the user input originated from a second user, etc. The user recognition component 295 also determines an overall confidence regarding the accuracy of user recognition operations. The user recognition component 295 may perform user recognition by comparing audio characteristics in the input audio data 211 to stored audio characteristics of users. The user recognition component 295 may also perform user recognition by comparing biometric data (e.g., fingerprint data, iris data, etc.) received by the system in correlation with the present user input to stored biometric data of users. The user recognition component 295 may further perform user recognition by comparing image data (e.g., including a representation of at least a feature of a user) received by the system in correlation with the present user input with stored image data (e.g., including representations of features of users). The user recognition component 295 may perform additional user recognition processes, including those known in the art. Output of the user recognition component 295 may be used to inform NLU processing as well as processing performed by speechlets 290 and/or skill servers 125.

The server(s) 120 may include a user profile storage 270. The user profile storage 270 may include a variety of information related to individual users, groups of users, etc. that interact with the system. The user profile storage 270 may include one or more customer profiles. Each customer profile may be associated with a different customer ID. A customer profile may be an umbrella profile specific to a group of users. That is, a customer profile encompasses two or more individual user profiles, each associated with a respective user ID. For example, a customer profile may be a household profile that encompasses user profiles associated with multiple users of a single household. A customer profile may include preferences shared by all the user profiles encompassed thereby. Each user profile encompassed under a single customer profile may include preferences specific to the user associated therewith. That is, each user profile may include preferences unique from one or more other user profiles encompassed by the same customer profile. A user profile may be a stand-alone profile or may be encompassed under a customer profile. As illustrated, the user profile storage 270 is implemented as part of the server(s) 120. However, it should be appreciated that the user profile storage 270 may be located proximate to the server(s) 120, or may otherwise be in communication with the server(s) 120, for example over the network(s) 199. User profile data may be used to inform NLU processing as well as processing performed by speechlets 290 and/or skill servers 125.

Figure 3:
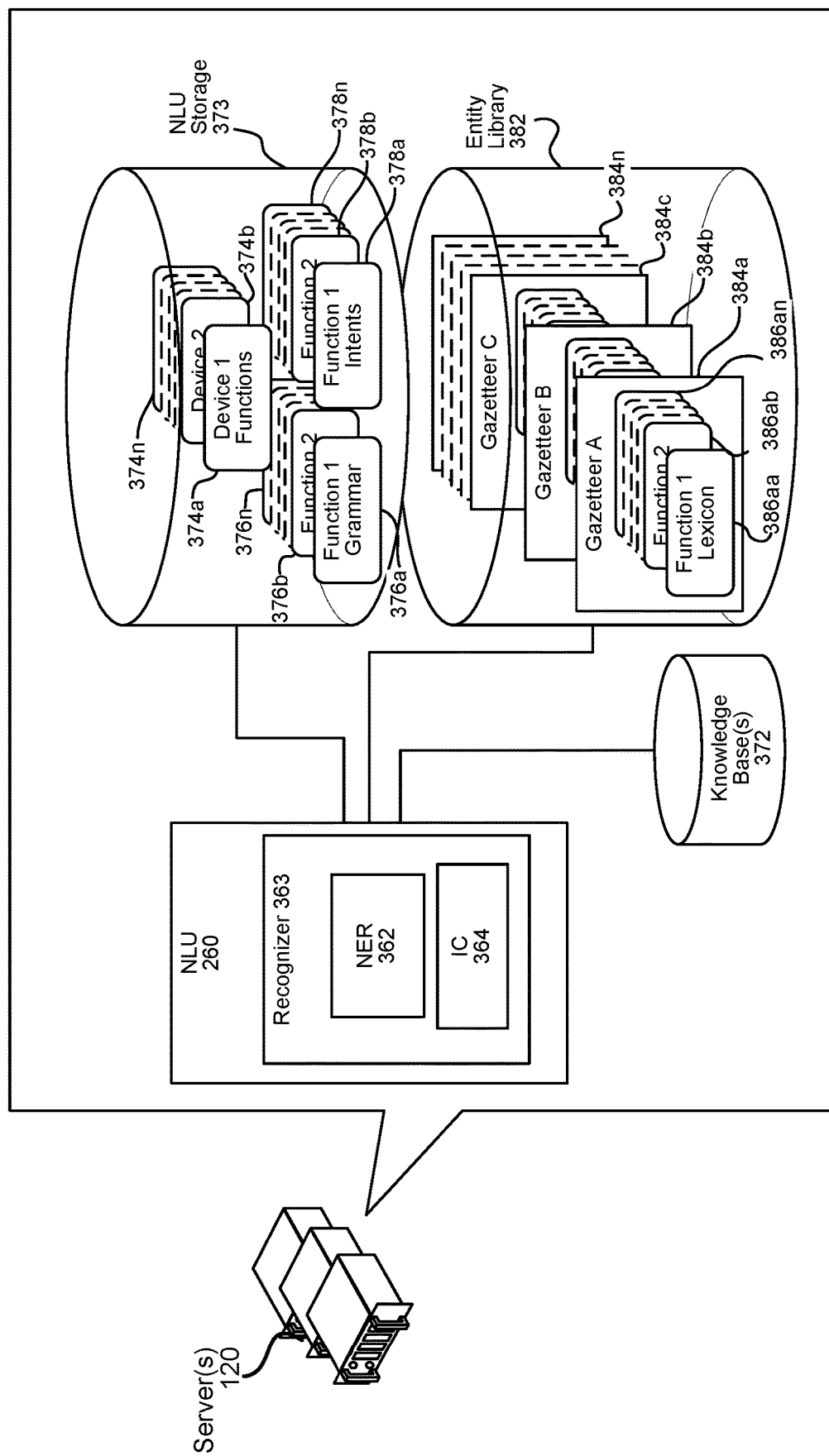
FIG. 3 is a conceptual diagram of how natural language processing is performed according to embodiments of the present disclosure.

FIG. 3 illustrates how NLU processing is performed on input text data. Generally, the NLU component 260 attempts to make a semantic interpretation of text represented in text data. That is, the NLU component 260 determines the meaning behind the text represented in text data based on the individual words. The NLU component 260 interprets text to derive an intent (e.g., a system action that the user desires the system to perform) as well as the pertinent pieces of information in the text that allow a device (e.g., device 110*a*, device 110*b*, server(s) 120, speechlet(s) 290, skill server(s) 125) to complete that action.

The NLU component 260 may process text data including several hypotheses of a single utterance. For example, if the ASR component 250 outputs ASR results including an N-best list of hypotheses, the NLU component 260 may process the text data with respect to all (or a portion of) the textual interpretations represented therein.

The NLU component 260 may include one or more recognizers 363. Each recognizer 363 may be associated with a different "function" or "content source" (e.g., a different speechlet 290 or skill). The NLU component 260 may determine a function potentially associated with the user input represented in text data input thereto in order to determine the proper recognizer 363 to process the hypothesis. The NLU component 260 may determine a user input represented in text data is potentially associated with more than one function. Multiple recognizers 363 may be functionally linked (e.g., a telephony/communications recognizer and a calendaring recognizer may utilize data from the same contact list).

If the NLU component 260 determines a user input represented in text data is potentially associated with multiple functions, the recognizers 363 associated with the functions may each process the text data in parallel. For example, if a user input potentially implicates both a communications function and a music function, a recognizer associated with the communications function may process the text data in parallel, or substantially in parallel, with a recognizer associated with the music function processing the text data. The output generated by each recognizer may be scored to indicate the respective recognizer's confidence in its processing of the text data.

The NLU component 260 may communicate with various storages to determine the potential function(s) associated with a user input represented in text data. The NLU component 260 may communicate with an NLU storage 373, which includes databases of devices (374*a*-374*n*) identifying functions associated with specific devices. For example, the device 110*a* may be associated with functions for music, calendaring, contact lists, device-specific communications, etc. In addition, the NLU component 260 may communicate with an entity library 382, which includes database entries about specific services on a specific device, either indexed by device ID, user ID, or group user ID, or some other indicator.

Each recognizer 363 may include a named entity recognition (NER) component 362. The NER component 362 attempts to identify grammars and lexical information that may be used to construe meaning with respect to a user input represented in text data input therein. The NER component 362 identifies portions of text represented in text data input into the NLU component 260 that correspond to a named entity that may be recognizable by the system. The NER component 362 (or other component of the NLU component 260) may also determine whether a word refers to an entity that is not explicitly mentioned in the utterance text, for example "him," "her," "it" or other anaphora, exophora or the like.

Each recognizer 363, and more specifically each NER component 362, may be associated with a particular grammar model and/or database 376, a particular set of intents/ actions 378, and a particular personalized lexicon 386. Each gazetteer 384 may include function-indexed lexical information associated with a particular user and/or device. For example, the Gazetteer A (384*a*) includes function-indexed lexical information 386*aa* to 386*an*. A user's music function lexical information might include album titles, artist names, and song names, for example, whereas a user's contact-list lexical information might include the names of contacts. Since every user's music collection and contact list is presumably different, this personalized information improves entity resolution.

An NER component 362 applies grammar models 376 and lexical information 386 associated with the function (associated with the recognizer 363 implementing the NER component 362) to determine a mention one or more entities in text data input thereto. In this manner, the NER component 362 identifies "slots" (i.e., particular words in text data) that may be needed for later processing. The NER component 362 may also label each slot with a type of varying levels of specificity (e.g., noun, place, city, artist name, song name, etc.).

Each grammar model 376 includes the names of entities (i.e., nouns) commonly found in text about the particular function to which the grammar model 376 relates, whereas the lexical information 386 is personalized to the user(s) and/or the device 110 from which the input audio data 211 or input text data 213 originated. For example, a grammar model 376 associated with a shopping function may include a database of words commonly used when people discuss shopping.

A downstream process called named entity resolution actually links a portion of text to an actual specific entity known to the system. To perform named entity resolution, the NLU component 260 may utilize gazetteer information (384a-384n) stored in an entity library storage 382. The gazetteer information 384 may be used to match text represented in text data with different entities, such as song titles, contact names, etc. Gazetteers may be linked to users (e.g., a particular gazetteer may be associated with a specific user's music collection), may be linked to certain function categories (e.g., shopping, music, video, communications, etc.), or may be organized in a variety of other ways.

Each recognizer 363 may also include an intent classification (IC) component 364. The IC component 364 parses text data to determine an intent(s) of the function associated with the recognizer 363 that potentially corresponds to the text data. An intent corresponds to an action the system is to perform that is responsive to the user input represented by the text data. The IC component 364 may communicate with a database 378 of words linked to intents. For example, a music intent database may link words and phrases such as "quiet," "volume off," and "mute" to a "mute" intent. The IC component 364 identifies potential intents by comparing words in the text data to the words and phrases in an intents database 378 associated with the function that is associated with the recognizer 363 implementing the IC component 364.

The intents identifiable by a specific IC component 364 are linked to function-specific (i.e., the function associated with the recognizer 363 implementing the IC component 364) grammar frameworks 376 with "slots" to be filled. Each slot of a grammar framework 376 corresponds to a portion of the text data that the system believes corresponds to an entity. For example, a grammar framework 376 corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar frameworks 376 may not be structured as sentences, but rather based on associating slots with grammatical tags.

For example, an NER component 362 may parse text data to identify words as subject, object, verb, preposition, etc. based on grammar rules and/or models prior to recognizing named entities in the text data. An IC component 364 (implemented by the same recognizer 363 as the NER component 362) may use the identified verb to identify an intent. The NER component 362 may then determine a grammar model 376 associated with the identified intent. For example, a grammar model 376 for an intent corresponding to <PlayMusic> may specify a list of slots applicable to play the identified "object" and any object modifier (e.g., a prepositional phrase), such as {Artist Name}, {Album Name}, {Song name}, etc. The NER component 362 may then search corresponding fields in a lexicon 386 associated with the function associated with the recognizer 363 implementing the NER component 362, attempting to match words and phrases in the text data the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse text data using heuristic grammar rules, or a model may be constructed using techniques such as hidden Markov models, maximum entropy models, log linear models, conditional random fields (CRF), and the like. For example, an NER component 362 implemented by a music function recognizer 363 may parse and tag text corresponding to "play mother's little helper by the rolling stones" as {Verb}: "Play," {Object}: "mother's little helper," {Object Preposition}: "by," and {Object Modifier}: "the rolling stones." The NER component 362 identifies "Play" as a verb based on a word database associated with the music function, which an IC component 364 (also implemented by the music function recognizer 363) may determine corresponds to a <PlayMusic> intent. At this stage, no determination has been made as to the meaning of "mother's little helper" and "the rolling stones," but based on grammar rules and models, the NER component 362 has determined that the text of these phrases relates to the grammatical object (i.e., entity) of the text data.

The frameworks linked to the intent are then used to determine what database fields should be searched to determine the meaning of these phrases, such as searching a user's gazetteer 384 for similarity with the framework slots. For example, a framework for a <PlayMusic> intent might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 384 does not resolve a slot/field using gazetteer information, the NER component 362 may search the database of generic words associated with the function (in the knowledge base 372). For example, if the text data including text corresponding to "play songs by the rolling stones," after failing to determine an album name or song name called "songs" by "the rolling stones," the NER component 362 may search the function's vocabulary for the word "songs." In the alternative, generic words may be checked before the gazetteer information, or both may be tried, potentially producing two different results.

The NLU component 260 may tag text to attribute meaning to the text. For example, the NLU component 260 may tag "play mother's little helper by the rolling stones" as: {intent} <PlayMusic>, {artist name} rolling stones, {media type} SONG, and {song title} mother's little helper. For further example, the NLU component 260 may tag "play songs by the rolling stones" as: {intent}<PlayMusic>, {artist name} rolling stones, and {media type} SONG.

Figure 4:
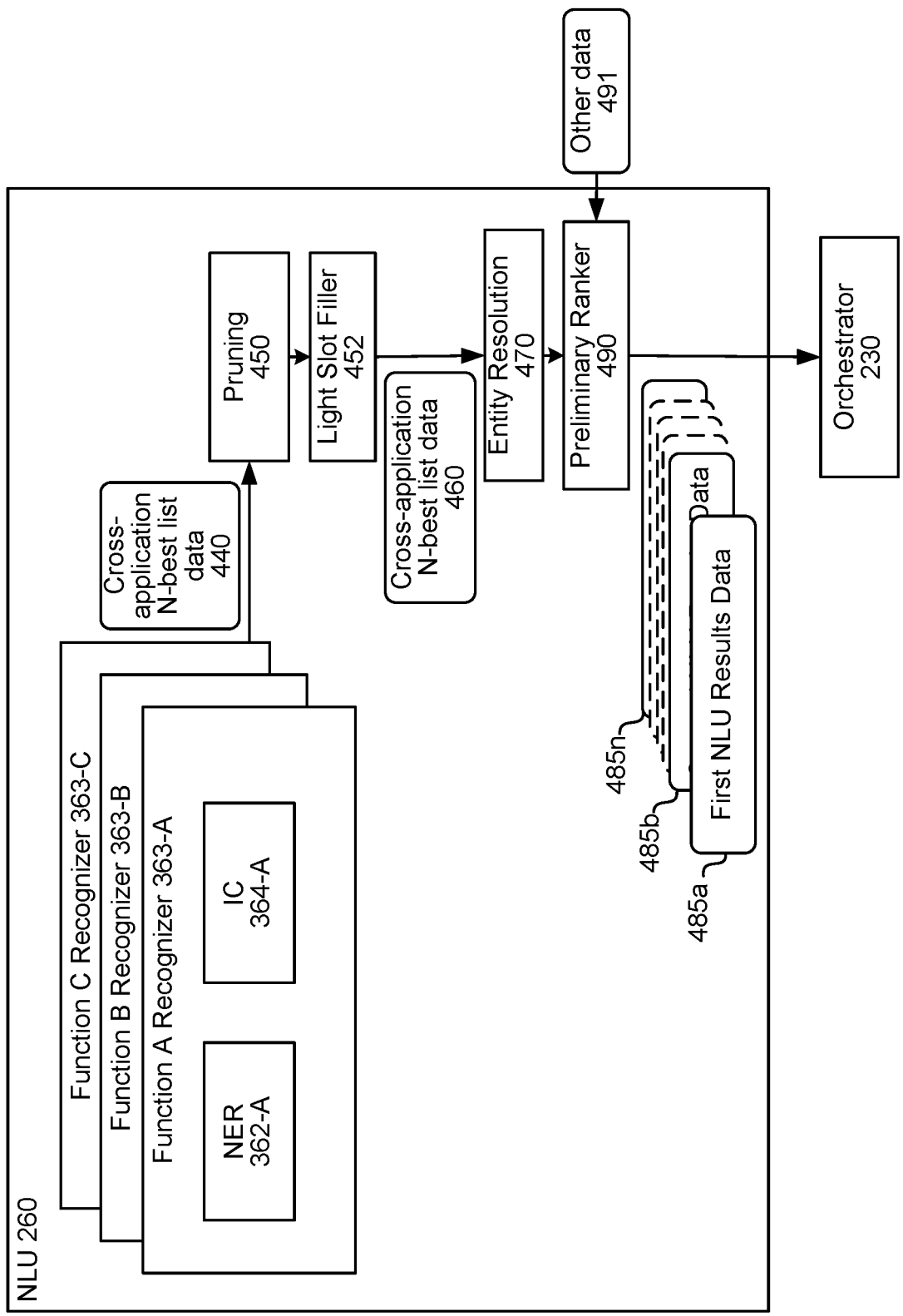
FIG. 4 is a conceptual diagram of how natural language processing is performed according to embodiments of the present disclosure.

The NLU component 260 may compile data, output by each of the recognizers 363 that processed the text data input to the NLU component 260, into a single N-best list, and may send N-best list data 440 (representing the N-best list) to a pruning component 450 (as illustrated in FIG. 4). Each entry in the N-best list data 440 may correspond to tagged text output by a different recognizer 363. Each entry in the N-best list data 440 may be associated with a respective score indicating the tagged text corresponds to the function associated with the recognizer 363 from which the tagged text was output. For example, the N-best list data 440 may be represented as:

Intent: <PlayMusic> ArtistName: Lady Gaga SongName: Poker Face
Intent: <PlayVideo> ArtistName: Lady Gaga VideoName: Poker Face
Intent: <PlayMusic> ArtistName: Lady Gaga AlbumName: Poker Face
Intent: <PlayMusic> SongName: Pokerface The pruning component 450 creates a new, shorter N-best list (i.e., represented in N-best list data 460 discussed below) based on the N-best list data 440. The pruning component 450 may sort the tagged text represented in the N-best list data 440 according to their respective scores.

The pruning component 450 may perform score thresholding with respect to the N-best list data 440. For example, the pruning component 450 may select entries represented in the N-best list data 440 associated with a score satisfying (e.g., meeting and/or exceeding) a score threshold. The pruning component 450 may also or alternatively perform number of entry thresholding. For example, the pruning component 450 may select the top scoring entry(ies) associated with each different category of function (e.g., music, shopping, communications, etc.) represented in the N-best list data 440, with the new N-best list data 460 including a total number of entries meeting or falling below a threshold number of entries. The purpose of the pruning component 450 is to create a new list of top scoring entries so that downstream, more resource intensive processes may only operate on the tagged text entries that most likely correspond to the user input input to the system.

The NLU component 260 may also include a light slot filler component 452. The light slot filler component 452 can take text from slots represented in the tagged text entry(ies) output by the pruning component 450 and alter it to make the text more easily processed by downstream components. The light slot filler component 452 may perform low latency operations that do not involve heavy operations such as reference to a knowledge base. The purpose of the light slot filler component 452 is to replace words with other words or values that may be more easily understood by downstream components. For example, if a tagged text entry includes the word "tomorrow," the light slot filler component 452 may replace the word "tomorrow" with an actual date for purposes of downstream processing. Similarly, the light slot filler component 452 may replace the word "CD" with "album" or the words "compact disc." The replaced words are then included in the N-best list data 460.

The NLU component 260 sends the N-best list data 460 to an entity resolution component 470. The entity resolution component 470 can apply rules or other instructions to standardize labels or tokens from previous stages into an intent/slot representation. The precise transformation may depend on the function (e.g., for a travel function, the entity resolution component 470 may transform a text mention of "Boston airport" to the standard BOS three-letter code referring to the airport). The entity resolution component 470 can refer to an authority source (e.g., a knowledge base) that is used to specifically identify the precise entity referred to in each slot of each tagged text entry represented in the N-best list data 460. Specific intent/slot combinations may also be tied to a particular source, which may then be used to resolve the text. In the example "play songs by the stones," the entity resolution component 470 may reference a personal music catalog, Amazon Music account, user profile (described herein), or the like. The entity resolution component 470 may output data including an altered N-best list that is based on the N-best list represented in the N-best list data 460, but also includes more detailed information (e.g., entity IDs) about the specific entities mentioned in the slots and/or more detailed slot data that can eventually be used by a function. The NLU component 260 may include multiple entity resolution components 470 and each entity resolution component 470 may be specific to one or more functions.

The entity resolution component 470 may not be successful in resolving every entity and filling every slot represented in the N-best list data 460. This may result in the entity resolution component 470 outputting incomplete results. The NLU component 260 may include a final ranker component 490, which may consider such errors when determining how to rank the tagged text entries for potential execution. For example, if a book function recognizer 363 outputs a tagged text entry including a <ReadBook> intent flag, but the entity resolution component 470 cannot find a book with a title matching the text of the item, the final ranker component 490 may re-score that particular tagged text entry to be given a lower score. The final ranker component 490 may also assign a particular confidence to each tagged text entry input therein. The confidence score of a particular tagged text entry may be affected by whether the tagged text entry has unfilled slots. For example, if a tagged text entry associated with a first function includes slots that are all filled/resolved, that tagged text entry may be associated with a higher confidence than another tagged text entry including at least some slots that are unfilled/unresolved.

The final ranker component 490 may apply re-scoring, biasing, or other techniques to obtain the most preferred tagged and resolved text entry. To do so, the final ranker component 490 may consider not only the data output by the entity resolution component 470, but may also consider other data 491. The other data 491 may include a variety of information. For example, the other data 491 may include function rating or popularity data. For example, if one function has a particularly high rating, the final ranker component 490 may increase the score of a tagged text entry(ies) associated with or otherwise invoking that particular function. The other data 491 may also include information about functions that have been specifically enabled by the user. For example, the final ranker component 490 may assign higher scores to tagged text entries associated with or otherwise invoking enabled functions than tagged text entries associated with or otherwise invoking non-enabled functions. User history may also be considered, such as if the user regularly uses a particular function or does so at particular times of day. Date, time, location, weather, type of device 110, user ID, context, and other information may also be considered. For example, the final ranker component 490 may consider when any particular functions are currently active (e.g., music being played, a game being played, etc.). Following final ranking, the NLU component 260 may output NLU output data 485 to the orchestrator component 230. The NLU output data 485 may include various entries, with each entry representing an NLU processing confidence score, an intent, slot data, and a potential skill or speechlet that may operating with respect to the respective entry's data.

Figure 5:
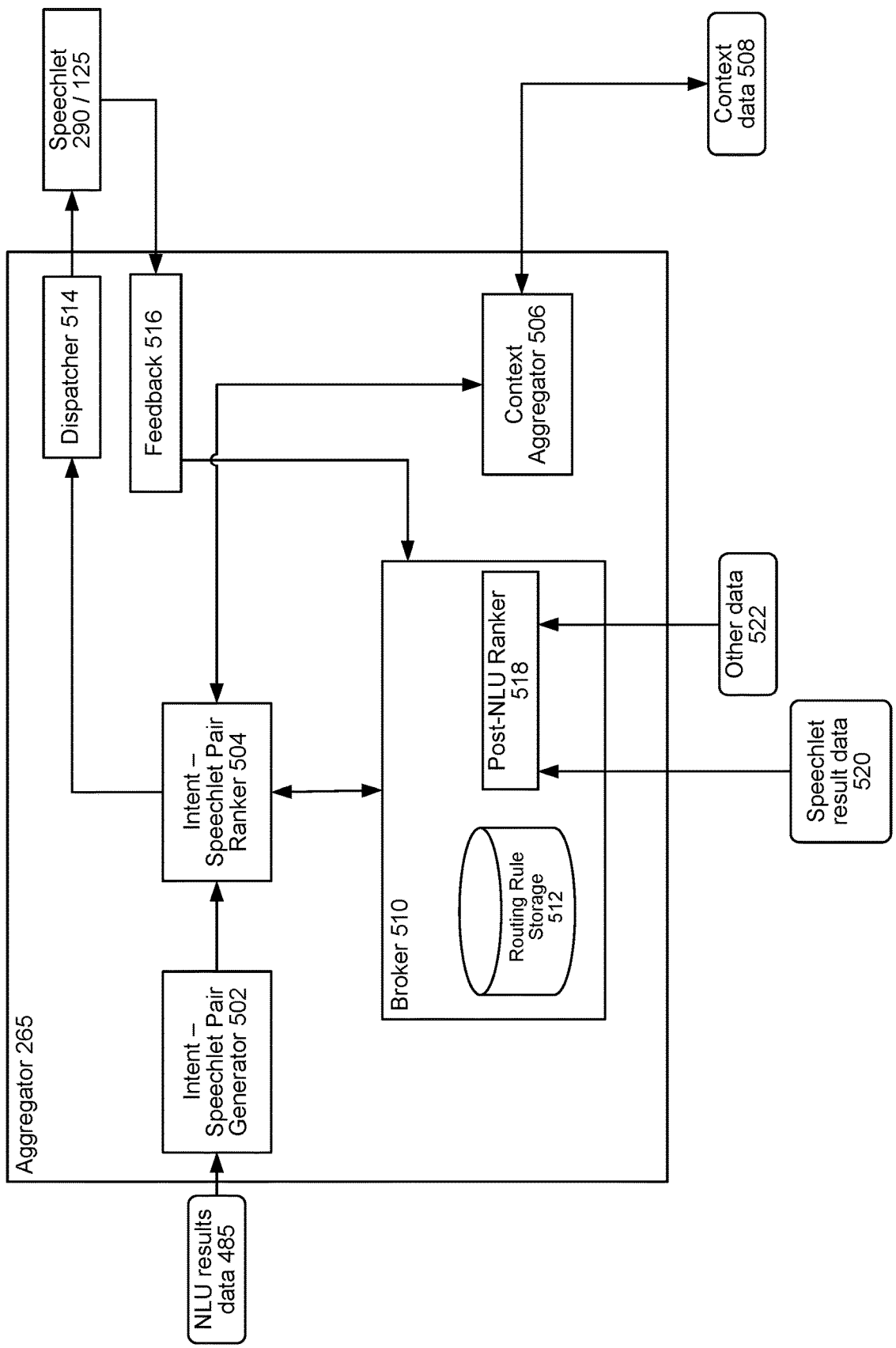
FIG. 5 is a conceptual diagram of how speech processing data is routed to a speechlet based on routing rules according to embodiments of the present disclosure.

FIG. 5 illustrates how speech processing data may be routed to a speechlet based on information known about the capabilities of individual speechlets, routing rules, or the like. When the aggregator component 265 receives NLU results data 485, the NLU results data 485 may be sent to an intent-speechlet pair generator 502. The intent-speechlet pair generator 502 resolves intent-speechlet pairs for a user input. For example, if the NLU results data 485 indicates an intent, the intent-speechlet pair generator 502 associates the intent with each speechlet that may execute with respect to the intent and the user input. For further example, if the NLU results data 485 indicates a plurality of potential intents (such as in an N-best list), the intent-speechlet pair generator 502 associates each intent with each speechlet that may execute with respect to the intent and the user input. As illustrated, the intent-speechlet pair generator 502 may be implemented at part of the aggregator component 265. However, one skill in the art will appreciate that the intent-speechlet pair generator 502 may be implemented as part of the NLU component 260 or in another configuration without departing from the present disclosure. In such a case, the NLU results data 485 may include intent-speechlet pairs.

The aggregator component 265 may also include an intent-speechlet pair ranker component 504. The intent-speechlet pair ranker component 504 ranks the intent-speechlet pairs generated by the intent-speechlet pair generator 502 based on, for example, the number of filled slots associated with a speechlet included in the NLU results data 485, an NLU confidence score associated with the speechlet and generated by the preliminary ranker 490, etc.

The aggregator component 265 may also include a context aggregator component 506. The context aggregator component 506 receives context data 508 from various contextual sources. The context data may include time data, which represents a time of receipt of the input audio 11 by the device 110*a*, a time of receipt of input text by the device 110*b*, a time or receipt of input data by the server(s) 120, etc.

The context data 508 may include skill availability data. Skill availability data may represent whether a given skill is available to execute with respect to a current user input or whether the skill is unavailable to execute with respect to the current user input due to, for example, the skill currently executing with respect to another user input of the system, the skill only operating at a certain time of day, etc.

The context data 508 may also include dialog data. A "dialog" or "dialog session" as used herein may refer to data transmissions (such as relating to multiple utterances) between the server(s) 120 and a local device (e.g., the device 110*a*/110*b*) that all relate to a single originating user input. Thus, the data transmissions of a dialog session may share a dialog ID or other unique identifier that may be used by an orchestrator component 230, speechlet(s) 290, skill server(s) 125, etc. to track information across the dialog session. For example, the device 110*a*/110*b* may send the server(s) 120 input data corresponding to "Alexa, play jeopardy." The server(s) 120 may send output data corresponding to a jeopardy statement to the device 110*a*/110*b* for output to a user(s). A user may then respond to the statement, which the device 110*a*/110*b* sends as input data to the server(s) 120. The sending of input data from the device 110*a*/110*b* to the server(s) 120 and the sending of output data from the server(s) 120 to the device 110 may all correspond to a single dialog session related to the originating user input "play jeopardy." In some examples, a dialog-initiating utterance may start with a wakeword, such as "Alexa, play jeopardy," where "Alexa" is the wakeword. Subsequent utterances of the same dialog session may or may not start with speaking of a wakeword. Each utterance of a dialog may be associated with a unique utterance ID such that multiple utterance IDs may be associated with a single dialog session ID.

Dialog data may include interactive focus information, (i.e., representing which speechlet was most recently called to execute a previous user input). Dialog data may also include content focus information (i.e., representing a speechlet that is streaming data to the device 110*a*/110*b* when the input data corresponding to the current user input is received by the server(s) 120). As will be described later, the context data 508 may be one portion of the data used to determine which speechlet should execute with respect to the current user input. Thus, unlike certain systems that use interactive focus and content focus as binary determinations regarding which speechlet should execute with respect to a current user input, the presently disclosed architecture considers focus along with other data, thereby minimizing disproportionate routing.

The context data 508 may also include device data. Device data may indicate characteristics of the device 110*a*/110*b* from which the original user input data was received. For example, such data may include information such as display capabilities of the device, a quality of one or more speakers of the device, a device type, etc. Device data may also represent a speechlet with which the device 110*a*/110*b* is associated. The device data may also indicate whether the device 110*a*/110*b* is currently streaming data or was streaming data when the original user input data was received and sent to the server(s) 120.

The context data 508 may also include user profile data. The user profile data may represent preferences and/or characteristics of the user that originated the current user input. Such data may be received from the profile storage 270.

The context data 508 may also include location data. The location data may represent a location of the device 110*a*/110*b* from which the original user input data was received.

The context data 508 may also include anaphora data. Anaphora data may be data used to resolve anaphora, exophora, or other references (like pronouns such as he, she, etc.) to entities that are not explicitly named in an utterance. The anaphora data may include entity identifiers or other information used to resolve anaphoric references in an utterance.

The context data 508 may also include other context data not explicitly recited herein.

The aggregator component 265 may also include a broker component 510, or the broker component 510 may reside outside of but be in communication with the aggregator component 265. The broker component 510 takes as input ranked intent-speechlet pair data and context data 508 from the intent-speechlet pair ranker component 504 and selects a best intent-speechlet pair for executing the user input. The broker component 510 may alternatively receive the context data 508 from the context aggregator 506, and not the intent-speechlet pair ranker component 504.

The broker component 510 may include a routing rule storage 512 that stores routing rule data for various speechlets 290. That is, the broker component 510 may use routing rules to disambiguate which speechlet 290 should execute a user input. The routing rule data may include deterministic rules such that is a routing rule is triggered, the speechlet 290 associate with the routing rule is called. A routing rule may be formulated as an "if_____, then_____" statement, such that if one or more conditions are satisfied, then route to the speechlet associated with the routing rule. For example, a routing rule may correspond to "if an NLU intent corresponds to <PlayVideo> and a FireTV stick is enabled, then route the output video data to the FireTV stick." For further example, a routing rule may correspond to "if an NLU intent corresponds to <SearchBook> and the device is an Echo, then route to books speechlet."

The routing rule storage 512 may be populated with routing rule data provided by one or more speechlets 290 and/or skill servers 125. Each routing rule may indicate an intent that a speechlet 290 and/or skill executed by a skill server(s) 125 can execute along with a set of conditions or facts that are relevant to the speechlet's and/or skill's execution. A single speechlet 290 or a single skill may be associated with more than one routing rule in the routing rule storage 512. For example when the speechlet 290 can execute with respect to more than one intent, the routing rule storage 512 may include routing rule data specific to each different intent the speechlet 290 can execute with respect to.

Each time a speechlet 290 or skill server 125 provides the system with a new routing rule, the system may attempt to validate the new routing rule before incorporating the new routing rule into the routing rule storage 512. Validating a new routing rule may include determining whether the new routing rule conflicts with any other routing rule presently stored in the routing rule storage 512.

The system may provide a speechlet 290 or skill server 125 with indications of the types of context data available to the system. This allows a speechlet 290 or skill server 125 to generate new routing rules with conditions limited to context data available to the system, thereby preventing a new routing rule from including superfluous conditions that cannot possibly be satisfied by data available to the system.

Figure 6:
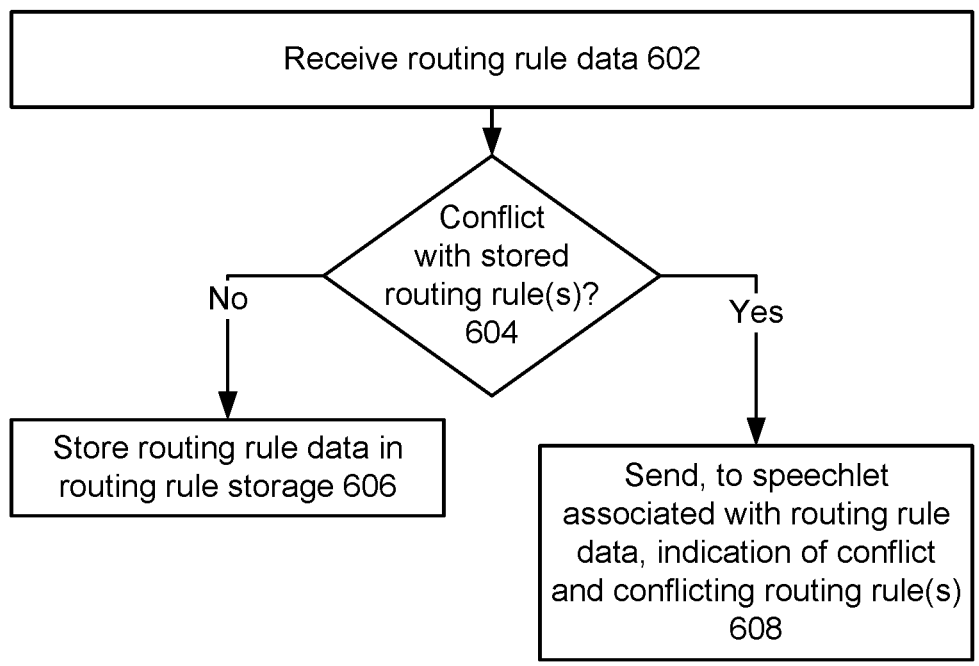
FIG. 6 is a process flow diagram illustrating how a system may validate routing rules and populate a routing rule storage according to embodiments of the present disclosure.

FIG. 6 illustrates how a system may validate routing rules and populate a routing rule storage. The server(s) 120 receives (602) routing rule data associated with a content source. The server(s) 120 determines (604) whether the routing rule data conflict with data representing one or more present stored routing rules. If the server(s) 120 determines the routing rule data does not conflict with one or more presently stored routing rules, the server(s) 120 stores (606) the routing rule data in a storage of routing rule data. If the server(s) 120 determines the routing rule data conflicts with one or more present stored routing rules, the server(s) 120 sends (608) an indication to the speechlet associated with the routing rule data, with the indication representing the conflict and the routing rule(s) the routing rule data conflicts with.

The system may build one or more decision trees to validate a new routing rule (i.e., determine wither the new routing rule conflicts with one or more stored routing rules). To build a decision tree, the system may run all fact sets of the stored routing rules. A split in a branch may represent a condition to be satisfied and a leaf may represent a speechlet to be routed to based on conditions represented by branches between the leaf and the trunk of the decision tree.

The system may then determine whether more than one speechlet is associated with a single leaf of the decision tree (i.e., whether routing rules for more than one speechlet contain the same conditions and outcomes). If so, a conflict exists. If not, no conflict exists and all routing rules may be implemented by the system.

Referring again to FIG. 5, the broker component 510 may determine routing rule data in the routing rule storage 512 that is associated with one or more speechlets represented in the ranked intent-speechlet pair data received from the intent-speechlet pair ranker component 504. The broker component 510 may determine which routing rule(s), represented in the determined routing rule data, is satisfied by information represented in the context data 508. For example, the "if" clause of a routing rule may include one or more conditions that must be satisfied in order for the routing rule to be satisfied. The conditions may relate to various contextual situations that the system may experience. Thus, the broker component 510 may determine whether information in the context data 508 fully satisfies the conditions of one or more routing rules represented in the determined routing rule data.

In addition to using the context data 508, the broker component 510 may also use the NLU results data 485 to determine whether all conditions of one or more routing rules are satisfied.

If the broker component 510 determines only one routing rule that is completely satisfied by the context data 508, the NLU results data 485, etc., the broker component 510 sends an indication of the speechlet associated with the routing rule to a dispatcher component 514. The broker component 510 may send the indication dispatcher component 514 either directly or indirectly via the intent-speechlet pair ranker component 504. The dispatcher component 514 invokes the speechlet 290/125 represented in the received indication. For example, the dispatcher component 514 may send the NLU results data, data indicating the user, etc. to the speechlet 290/125 so the speechlet 290/125 can generate output responsive to the user input.

The aggregator component 265 may also include a feedback component 516 that builds feedback loops for understanding whether a selection of a speechlet was correct. For example, the feedback component 516 may receive data representing how the user responds to the selected speechlet 290/125 and may send such data to the broker component 510 to facilitate improvements (e.g., updates of routing rules, etc.).

If the broker component 510 determines more than one routing rule that is completely satisfied by the context data 508, the NLU results data 485, etc., the broker component 510 invokes a post-NLU ranker component 518.

The post-NLU ranker component 518 may operate one or more trained models that are configured to process the NLU results data 485, speechlet result data 520, and other data 522 in order to determine a single best speechlet for executing with respect to the current user input. The post-NLU ranker component 518 may request a first speechlet 290a/125a and a second speechlet 290b/125b, associated with the more than one satisfied routing rule, to provide potential output data (e.g., data the speechlet would provide to a user if the speechlet were selected to execute with respect to the user input) based on the NLU results data 485. For example, the post-NLU ranker component 518 may send a first portion of the NLU results data, associated with a first speechlet whose routing rule was satisfied, to the first speechlet along with a request for the first speechlet to at least partially execute a user input with respect to the first portion of the NLU results data. The post-NLU ranker component 518 may also send a second portion of the NLU results data, associated with the second speechlet whose routing rule was satisfied, to the second speechlet along with a request for the second speechlet to at least partially execute a user input with respect to the second portion of the NLU results data. The post-NLU ranker component 518 receives, from the first content source, first result data 520a generated from the first content source's execution with respect to the first portion of the NLU results data. The post-NLU ranker component 518 also receives, from the second content source, second results data 520b generated from the second content source's execution with respect to the second portion of the NLU results data. Based on the first results data 520a, a first NLU confidence score associated with the first content source, the second results data 520b, a second NLU confidence score associated with the second content source, and other data 522 (e.g., context data, user profile data, etc.), the post-NLU ranker component 518 determines the best speechlet for executing the current user input. The post-NLU ranker component 518 sends an indication of the best speechlet to the dispatcher component 514, either directly or indirectly via the intent-speechlet pair ranker 504.

If the broker component 510 determines more than one routing rule that is completely satisfied by the context data 508, the NLU results data 485, etc., the system may alternatively query speechlets associated with the intent represented in the NLU results data 485, and send an indication of the first speechlet that indicates it can execute the user input to the dispatcher component 514.

One or more models implemented by components of the orchestrator component 230, aggregator component 265, or other component may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component requires establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 7:
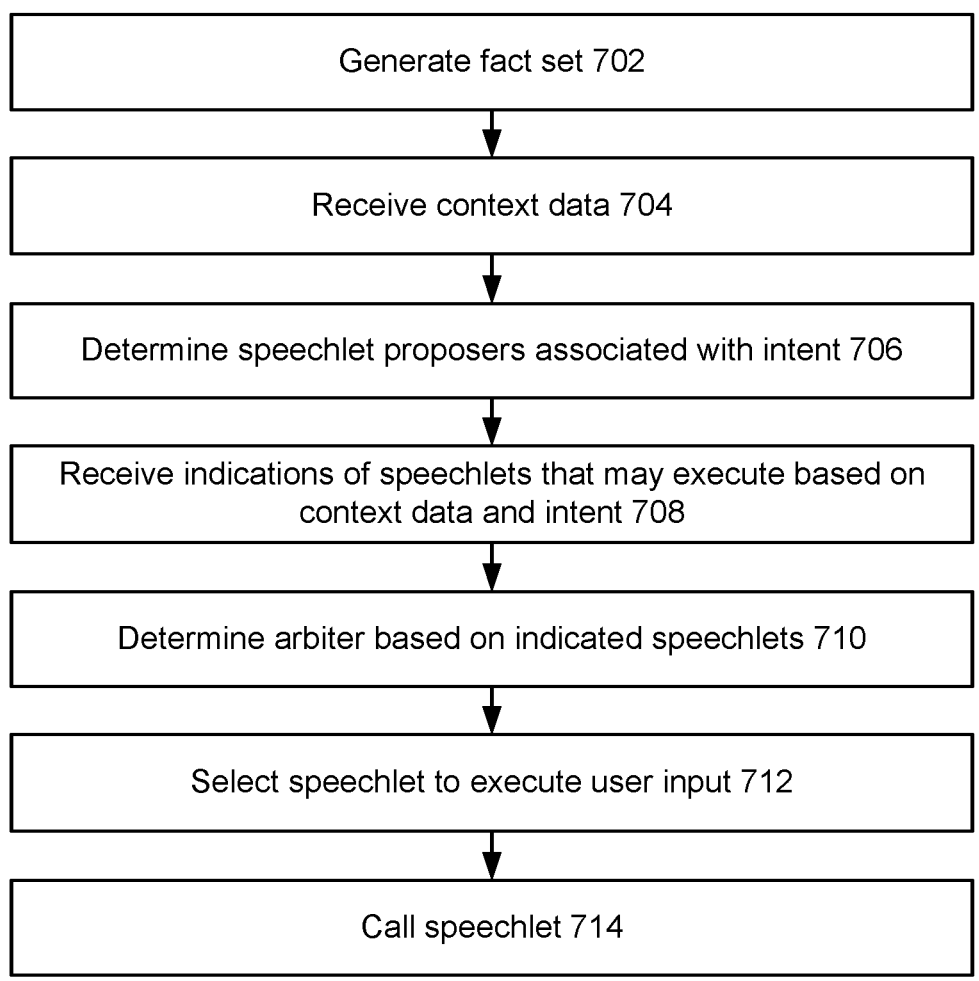
FIG. 7 is a process flow diagram illustrating how a system may determine a speechlet to execute a user input according to embodiments of the present disclosure.

FIG. 7 illustrates how a system may determine a speechlet to execute a user input. The server(s) 120 generates (702) a fact set. The fact set may correspond to data representing an intent associated with a highest NLU confidence score represented in the NLU results data 485. The server(s) 120 also receives (704) context data from various sources. The server(s) 120 determines (706) speechlet proposers associated with the intent. The server(s) 120 receives (708), from the speechlet proposers, indications of speechlets that may execute given the context data and the intent. Each speechlet proposer may propose one, or more than one content source. The server(s) 120 determines (710) an arbiter based on the indicated speechlets. The server(s) 120 may determine an arbiter with authority to resolve a conflict among the indicated speechlets. A conflict, at this stage in system processing, may refer to an instance where more than one speechlet is indicated as potentially being able to execute give the content data and the intent. The server(s) 120, namely the arbiter, selects (712) the speechlet to execute the user input based on the routing rules associated with the indicated speechlets. The server(s) 120 then calls (714) the speechlet to execute the user input with respect to NLU results data 485 associated with the content source. One or more of the steps described with respect to FIG. 7 may be performed by the, or a component of, the broker component 510.

Figure 8:
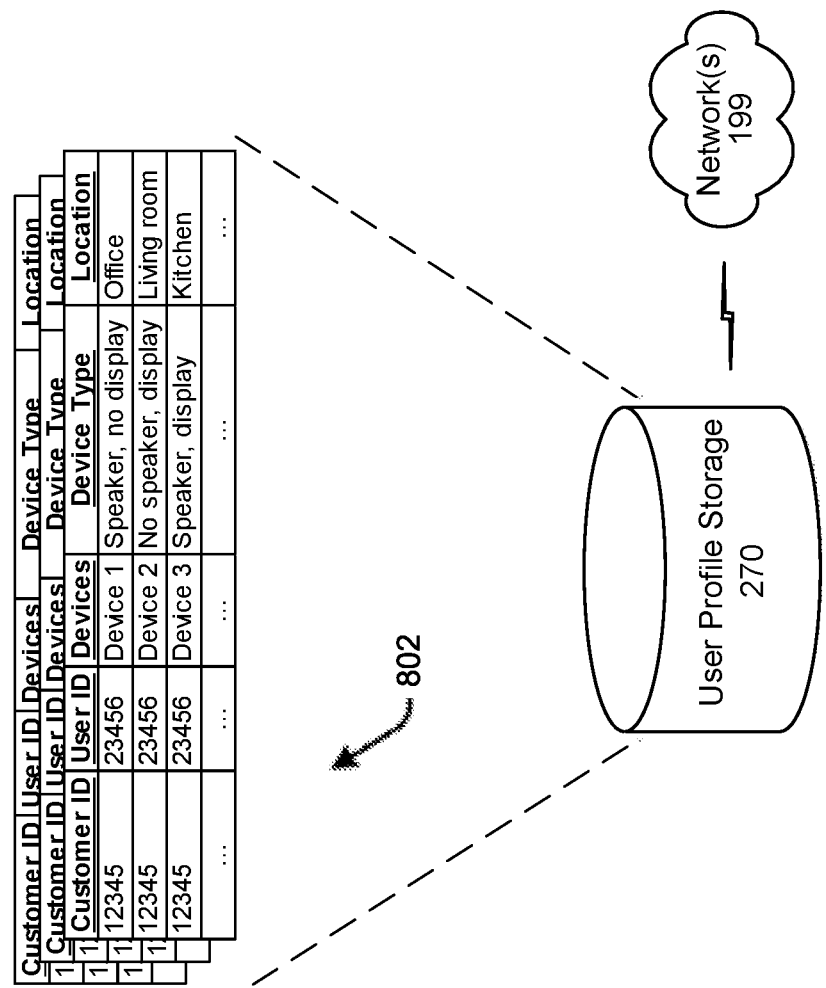
FIG. 8 illustrates data stored and associated with user profiles according to embodiments of the present disclosure.

FIG. 8 illustrates the user profile storage 270 that includes data regarding customer profiles as well as individual user profiles 802. Each user profile 802 may include information indicating various devices, output capabilities of each of the various devices, and a location of each of the various devices. The output capabilities and location of each device may be useful for routing rule processing as described herein. One or more of the devices represented in a user profile may be media playback devices (e.g., devices that may output music, video, etc.). Each user profile 802 may additionally include other data not explicitly illustrated.

Figure 9:
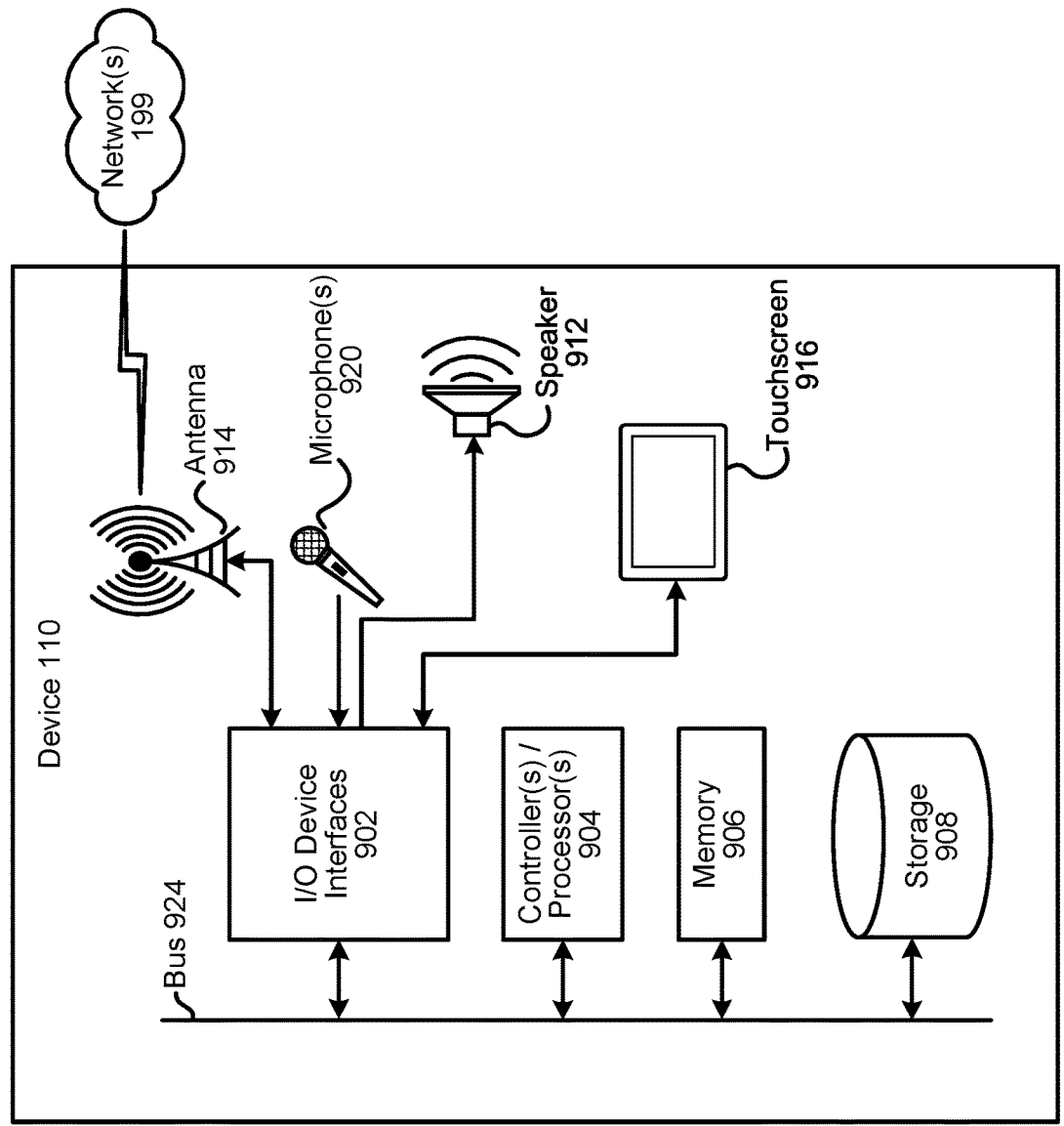
FIG. 9 is a block diagram conceptually illustrating example components of a device according to embodiments of the present disclosure.

FIG. 9 is a block diagram conceptually illustrating a user device 110 that may be used with the system. FIG. 10 is a block diagram conceptually illustrating example components of a remote device, such as the server(s) 120, which may assist with ASR processing, NLU processing, or command processing. Multiple servers 120 may be included in the system, such as one or more servers 120 for performing ASR, one or more servers 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (902/1002).

Computer instructions for operating each device (110/120) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120) includes input/output device interfaces (902/1002). A variety of components may be connected through the input/output device interfaces (902/1002), as will be discussed further below. Additionally, each device (110/120) may include an address/data bus (924/1024) for conveying data among components of the respective device. Each component within a device (110/120) may also be directly connected to other components in addition to (or instead of) being connected to other components across the bus (924/1024).

Referring to FIG. 9, the device 110 may include input/output device interfaces 902 that connect to a variety of components such as an audio output component such as a speaker 912, a wired headset or a wireless headset (not illustrated), or other component capable of outputting audio. The device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 916 for displaying content.

Via antenna(s) 914, the input/output device interfaces 902 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system 100 may be distributed across a networked environment. The I/O device interface (902/1002) may also include communication components that allow data to be exchanged between devices such as different physical servers in a collection of servers or other components.

The components of the device(s) 110 and the server(s) 120 may include their own dedicated processors, memory, and/or storage. Alternatively, one or more of the components of the device(s) 110 and the server(s) 120 may utilize the I/O interfaces (902/1002), processor(s) (904/1004), memory (906/1006), and/or storage (908/1008) of the device(s) 110 and server(s) 120, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110 and the server(s) 120, as described herein, are exemplary, and may be located as a stand-alone device or may be included, in whole or in part, as a component of a larger device or system.

As illustrated in FIG. 11, multiple devices (110*a*-110*g*, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110*a*, a smart phone 110*b*, a smart watch 110*c*, a tablet computer 110*d*, a vehicle 110*e*, a speech-detection and display device 110*f*, and/or a smart TV 110*g* may be connected to the network(s) 199 through a wireless service provider, over a WiFi or cellular network connection, or the like. Other devices are included as network-connected support devices, such as the server(s) 120, skill server(s) 125, or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A system, comprising:
   at least one processor; and
   at least one memory comprising instructions that, when executed by the at least one processor, cause the system to:
   receive, from a first component, first routing data representing a device type condition for causing the first component to execute a first intent of a user input;
   after receipt of the first routing data, receive, from a first device, first data representing a first natural language input;
   determine device type data corresponding to the first device;
   perform processing using the first data, the first routing data, and the device type data, to determine the first natural language input corresponds to the first intent to be executed by the first component; and
   based at least in part on the device type data satisfying the device type condition, cause the first intent to be executed by the first component.

2. The system of claim 1, wherein the at least one memory further comprises instructions that, when executed by the at least one processor, further cause the system to:
   determine natural language understanding (NLU) results data representing the first natural language input;
   determine the NLU results data indicates the first component; and
   send the NLU results data to the first component.

3. The system of claim 1, wherein the at least one memory further comprises instructions that, when executed by the at least one processor, further cause the system to:
   determine first natural language understanding (NLU) results data representing a first interpretation of the first natural language input;
   determine second NLU results data representing a second interpretation of the first natural language input; and
   use the device type data to select the first interpretation to be executed by the first component, wherein the first interpretation corresponds to the first intent to be executed by the first component.

4. The system of claim 1, wherein the at least one memory further comprises instructions that, when executed by the at least one processor, further cause the system to:
   process the device type data using the first routing data to determine the device type data satisfies the device type condition.

5. The system of claim 1, wherein the at least one memory further comprises instructions that, when executed by the at least one processor, further cause the system to:
   determine second data representing an availability of the first component,
   wherein causing the first intent to be executed by the first component is based at least in part on the second data.

6. The system of claim 1, wherein the first routing data represents at least one deterministic rule and wherein the at least one memory further comprises instructions that, when executed by the at least one processor, further cause the system to:
   determine the at least one deterministic rule is satisfied.

7. The system of claim 1, wherein performance of the processing comprises using at least one trained model.

8. The system of claim 1, wherein the first routing data further corresponds to a second component different from the first component and wherein performance of the processing comprises selection of the first component instead of the second component.

9. The system of claim 1, wherein the first component corresponds to control of one or more home devices.

10. The system of claim 1, wherein the at least one memory further comprises instructions that, when executed by the at least one processor, further cause the system to:
    determine location data corresponding to the first device; and
    further using the location data to determine the first natural language input corresponds to the first intent to be executed by the first component.

11. A computer-implemented method comprising:
    receiving, from a first component, first routing data representing a device type condition for causing the first component to execute a first intent of a user input;
    after receipt of the first routing data, receiving, from a first device, first data representing a first natural language input;
    determining device type data corresponding to the first device;
    performing processing using the first data, the first routing data, and the device type data, to determine the first natural language input corresponds to the first intent to be executed by the first component; and
    based at least in part on the device type data satisfying the device type condition, causing the first intent to be executed by the first component.

12. The computer-implemented method of claim 11, further comprising:
    determining natural language understanding (NLU) results data representing the first natural language input;
    determining the NLU results data indicates the first component; and
    sending the NLU results data to the first component.

13. The computer-implemented method of claim 11, further comprising:
    determining first natural language understanding (NLU) results data representing a first interpretation of the first natural language input;
    determining second NLU results data representing a second interpretation of the first natural language input; and
    using the device type data to select the first interpretation to be executed by the first component, wherein the first interpretation corresponds to the first intent to be executed by the first component.

14. The computer-implemented method of claim 11, further comprising:
    processing the device type data using the first routing data to determine the device type data satisfies the device type condition.

15. The computer-implemented method of claim 11, further comprising:
    determining second data representing an availability of the first component, wherein causing the first intent to be executed by the first component is based at least in part on the second data.

16. The computer-implemented method of claim 11, wherein the first routing data represents at least one deterministic rule, and the method further comprises:

determining the at least one deterministic rule is satisfied.

17. The computer-implemented method of claim 11, wherein performance of the processing comprises using at least one trained model.

18. The computer-implemented method of claim 11, wherein the first routing data further corresponds to a second component different from the first component and wherein performance of the processing comprises selection of the first component instead of the second component.

19. The computer-implemented method of claim 11, wherein the first component corresponds to control of one or more home devices.

20. The computer-implemented method of claim 11, further comprising:

determining location data corresponding to the first device; and further using the location data to determine the first natural language input corresponds to the first intent to be executed by the first component.

* * * * *